United States Patent [19]

Marui et al.

[11] Patent Number: 4,604,794
[45] Date of Patent: Aug. 12, 1986

[54] METHOD OF MANUFACTURING BATTERY PLATE GROUPS

[75] Inventors: Takao Marui; Tetsuo Uwani, both of Takatsuki, Japan

[73] Assignee: Yuasa Battery Company Limited, Takatsuki, Japan

[21] Appl. No.: 400,268

[22] Filed: Jul. 21, 1982

[51] Int. Cl.⁴ .............................................. H01M 6/00
[52] U.S. Cl. .................. 29/623.1; 29/623.3; 29/730; 493/433
[58] Field of Search ..................... 29/623.1, 623.3, 730; 493/433; 53/117, 120, 157, 591, 466, 453, 228, 559; 429/131, 136

[56] References Cited

U.S. PATENT DOCUMENTS

| | | | |
|---|---|---|---|
| 2,765,164 | 10/1956 | Hand | 493/433 |
| 3,772,089 | 11/1973 | Bennett et al. | 29/623.3 |
| 3,900,341 | 8/1975 | Shoichiro et al. | |
| 4,029,855 | 6/1977 | Dougherty et al. | 29/623.1 |

OTHER PUBLICATIONS

Japanese Patent Application No. 29822/56, published Jul. 10, 1981.
Japanese Laid Open Application No. JA-OS 149636/53, Dec. 27, 1978.

*Primary Examiner*—Howard N. Goldberg
*Assistant Examiner*—P. W. Echols
*Attorney, Agent, or Firm*—Watson, Cole, Grindle & Watson

[57] ABSTRACT

A method of manufacturing battery plate groups by forming folding habits in a soft, continuous separator at regular intervals so that the folding directions may be alternated, and then alternately inserting positive plates and negative plates between the separator portions.

2 Claims, 3 Drawing Figures

METHOD OF MANUFACTURING BATTERY PLATE GROUPS

BACKGROUND OF THE INVENTION

1. Field of the Invention

This invention relates to a method of manufacturing battery plate groups.

2. Description of the Prior Art

U.S. Pat. No. 3,900,341 to Shoichiro et al discloses a method of manufacturing storage batteries by housing a battery plate with an envelope-type separator. According to this method, however, it is difficult to manufacture the storage batteries continuously. In order to overcome such difficulty Japanese Patent Publication No. 29822/56, published on July 10, 1981, and JA-OS No. 149636/53, laid open for public inspection on Dec. 27, 1978, disclose a method of manufacturing the separators by folding a strip-like sheet. The method disclosed in these prior publications has also a disadvantage that, the thus-formed separator is liable to be unfolded, which causes the productivity rate to be lowered.

SUMMARY OF THE INVENTION

An object of the present invention is to provide a method of manufacturing improved battery plate groups having a very high productivity.

The manufacturing method according to the present invention comprises a step of forming habit folds in a soft, continuous separator strip, the habit folds being formed at regular intervals so that the folding directions may be alternated and a step of inserting plates between adjacent strip portions defined by the folding habits.

Further objects, advantages and features of the present invention will become more fully apparent from a detailed consideration of the arrangement and construction of the constituent parts as set forth in the following specification taken together with the accompanying drawing.

DETAILED DESCRIPTION OF PREFERRED EMBODIMENTS

Figure 1:
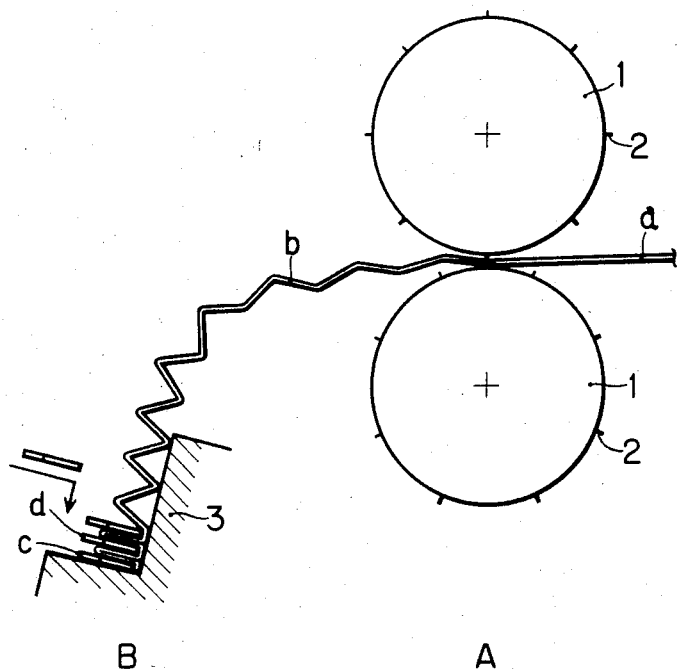
FIG. 1 schematically depicts an apparatus which can be utilized to practice one embodiment of the method according to the present invention.

An apparatus which can be used to practice one embodiment of the method according to the present invention is schematically illustrated in FIG. 1. In FIG. 1, A indicates the apparatus for forming the habit folds and B indicates the apparatus for achieving the plate-inserting step. Rotors 1, which are rotated by a single motor via a reduction gear (not shown) and which are made of plastic materials such as, for example, hard vinyl chloride, are provided and are so set as to be rotated in phases displaced by half a pitch from each other. Each of the rotors 1 has a radius of 200 mm and width of 60 mm and has projections 2 of a height of 1 mm formed on eight equal divisions around its periphery and extend along its entire width.

By the way, the height of the projection 2 is regulated also by the thickness of the separator but is proper in the range of 0.7 to 2 mm. When the cross-section of the fold of the separator is U-shaped, it will be easy to insert a plate between the separators and the separator will not be likely cut off in the fold. However, if the projection is knife-edged at the end of the folding habits for one cell, so that the fold may be V-shaped, there will be an advantage that will be easy to cut off the separator for one cell.

When such a soft (pliable) continuous flat smooth separator a which has a width of 50 mm and is made of, for example, a glass mat comprising a layer of glass fiber having a fiber diameter of about 1 micron, is inserted and passed between the rotors 1 and the rotors 1 are rotated by a motor (not shown), there will be obtained a separator b having folding habits formed in alternate folding directions at intervals of about 78.5 mm.

The clearance between the rotors 1 can be freely varied, but the clearance between the projection 2 and a peripheral surface of the rotor 1 at the time of forming folding habits is best in the range of $\frac{1}{8}$ to $\frac{1}{2}$ of the thickness of the separator and is preferably about $\frac{1}{4}$ of the thickness. It is found from this that, in the case of forming folding habits in a separator of a thickness of 1 mm, the distance between the axes of the rotors 1 may be made 401.5 mm.

Then, the separator b having the formed folding habits if fed to the apparatus B for achieving the plate-inserting step. As the separator b is positioned in the jig 3, negative plates c and positive plates d are first moved alternatively from one direction as indicated by the arrow (by apparatus not shown) toward the folding habits of the separator b having the formed folding habits and then move in the direction of overlapping the plates so as to be overlapped. Thus, the positive plates d and negative plates c are alternately inserted through twofold separators in conformity with the folding habits formed in the separator b.

Figure 2:
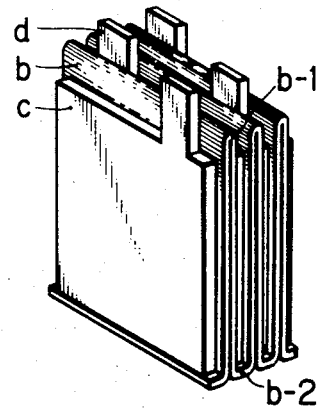
FIG. 2 is a perspective view of one embodiment of a plate group obtained by the method of the present invention.

A battery plate group formed by such a method of manufacturing is shown in FIG. 2. In FIG. 2, the lower folded part b-2 of the separator is wider than the upper folded part b-1. By this manufacturing method, the workability improved to be about 30% higher than by a conventional method. That is to say, in the conventional system of inserting a plate between folded separators, as no folding habit is made in the fold, the folds of the separator are irregular and, as the separators holding the plate open, the working efficiency is low.

An embodiment of the present invention has been explained in the above. However, various working modes are thought in a range not deviating from the subject matter of the present invention.

Figure 3:
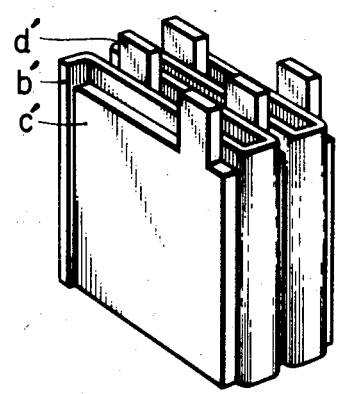
FIG. 3 is a perspective view of another embodiment of a plate group obtained by the method of the present invention.

For example, in the above-mentioned embodiment, it is exemplified to insert positive plates and negative plates through twofold separators. However, the separators may be of any folds. That is to say, FIG. 3 shows another embodiment of a battery plate group obtained by the present invention wherein positive plates d' and negative plates c' are inserted through onefold separators b' having formed folding habits. By the way, there is an advantage that, when the plates are inserted through even number-fold separators, the plates will be able to be inserted in only one direction.

As in the above, the present invention is valuable in providing an improved productivity of batteries.

We claim:

1. A method of manufacturing battery plate groups which comprises
 (a) providing a pliable, smooth, continuous glass fiber mat which has a predetermined thickness,
 (b) providing a pair of plastic rotors which are aligned in parallel, said rotors including circumferential surfaces and equal numbers of projections extending outwardly from their circumferential surfaces a distance of between 0.7 mm and 2 mm,
 (c) spacing said rotors apart such that a clearance is provided between the projections on one rotor and the circumferential surface of the other rotor which is between $\frac{1}{3}$ and $\frac{1}{2}$ said predetermined thickness of said glass fiber mat,
 (d) rotating both said rotors such that the projections from one rotor are displaced by half a pitch from the projections from the other rotor,
 (e) passing said glass fiber mat between said rotors such that the projections thereon form alternately-directed folding habits therein at regular intervals along its length and to provide interconnected separator portions which are aligned in an accordion-like fashion,
 (f) providing an alternating series of positive and negative battery plates on only one side of said interconnected separator portions, and
 (g) sequentially inserting said positive and negative battery plates between adjacent separator portions.

2. A method of manufacturing battery plate groups according to claim 1 wherein said folding habits formed in said glass fiber mat have a U-shaped cross-section.

* * * * *